A. L. SOHM.
DIRECT CURRENT MOTOR.
APPLICATION FILED SEPT. 16, 1908.
950,213.
Patented Feb. 22, 1910.
2 SHEETS—SHEET 2.
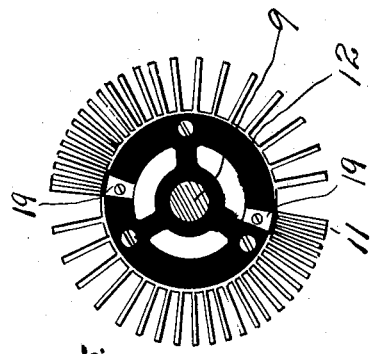
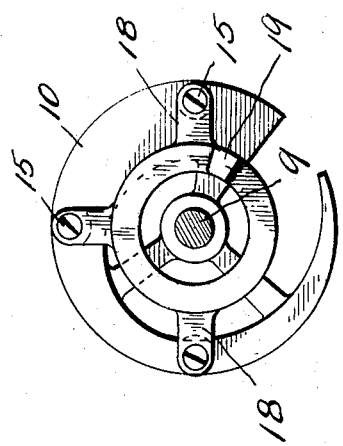
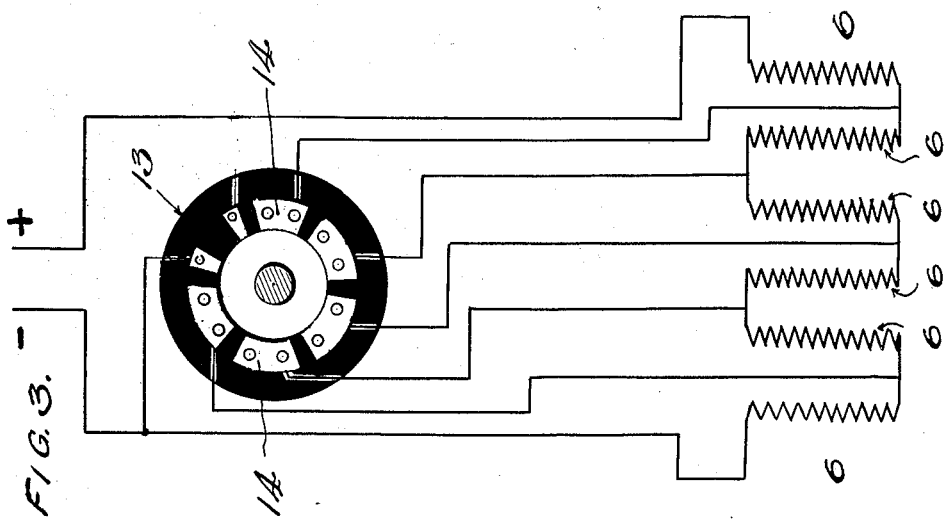
WITNESSES
C. K. Davis
H. D. Smith.
A. L. Sohm
INVENTOR
by C. L. Parker.
Attorney

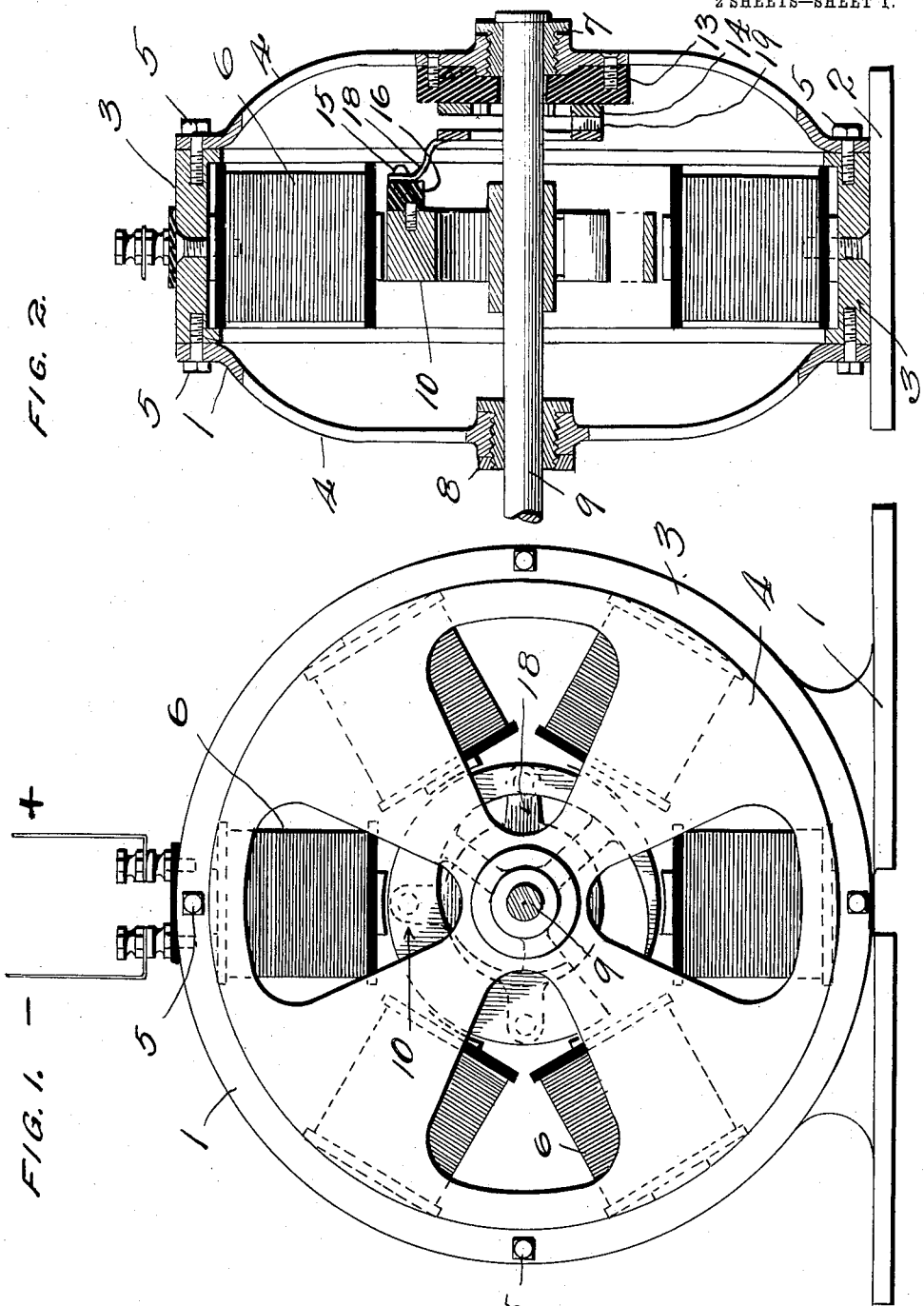

UNITED STATES PATENT OFFICE.

ALFRED L. SOHM, OF WHITTIER, CALIFORNIA, ASSIGNOR OF ONE-THIRD TO TRIPHON D. HEYL AND ONE-THIRD TO CHESTER L. ADAMS, OF WHITTIER, CALIFORNIA.

DIRECT-CURRENT MOTOR.

950,213.  Specification of Letters Patent.  Patented Feb. 22, 1910.

Application filed September 16, 1908. Serial No. 453,398.

*To all whom it may concern:*

Be it known that I, ALFRED L. SOHM, a citizen of the United States, residing at Whittier, in the county of Los Angeles and State of California, have invented certain new and useful Improvements in Direct-Current Motors, of which the following is a specification.

This invention relates to a new type of direct current motor wherein no commutator is required or provided and wherein a wireless armature is employed.

It is well known in the electrical art that nearly, if not all of the troubles encountered in the use of direct current motors of the type now in use, are directly attributable to causes arising from the wirings of the armature or from the use of the commutator. Furthermore in such type of motor, a considerable portion of the current consumed is ineffectively utilized in the armature windings.

Now I have devised a direct current motor which does not require either armature windings or a commutator, and which is accordingly wholly free from the troubles arising from these sources. Furthermore, I have provided a motor wherein practically all of the current consumed is effectively utilized in producing armature rotation.

For purposes of illustration, I have shown in the accompanying drawings and set forth in the following description, a preferred embodiment of my invention, and from these and the appended claims, the nature of my invention, in its generic as well as its specific, aspects will be apparent.

In the drawings, Figure 1 is a side elevation of the embodiment of my invention selected for purposes of illustration. Fig. 2 is a cross section taken vertically therethrough. Fig. 3 is a diagrammatic view of the wirings of the motor. Fig. 4 is a detail side elevation of the armature employed therein, and, Fig. 5 is a detail side elevation of a modified form of armature.

The motor in the form illustrated, comprises a frame 1, consisting of a metal supporting base 2, upon which is mounted the field magnet supporting ring 3, and apertured plates 4, the latter being secured to opposite sides of the ring by bolts 5. Field magnets 6 are disposed about the inner periphery of the ring 3, and extend radially inward therefrom, as shown. Centrally disposed within the side plates 4 are bearings 7 and 8 within which is mounted the armature shaft 9 to one end of which a pulley (not shown) is secured in the usual manner. Mounted upon the shaft 9, is an armature 10 consisting of an eccentrically mounted mass of magnetic metal in the approximate form of a curved wedge, having a short space between the ends thereof, and the outer periphery being approximately circular in form and in proximity to the inner ends of the field magnets 6.

I have found that the form of armature may be variously modified providing it, or a portion of it, increases in bulk circumferentially from one point to another. For example, an advantageous form of my armature may be constructed of a plurality of segments each increasing in bulk circumferentially as illustrated in Fig. 5 in which modification, the bulk is increased circumferentially in each segment by the employment of radial plates or bars of magnetic metal which are mounted upon a supporting ring 12 of similar metal with a gradually increasing space between the plates or bars from one end of the segment to the other.

Secured to one of the side plates 4 of the frame is a circular plate 13 of fiber or other insulating material upon which is mounted a number of copper segments or plates 14, the number of segments or plates exceeding the number of field magnets by one. It will be noted that 7 segments are illustrated, and that 5 of such segments are of equal size and similarly disposed, and that the 2 remaining segments if united, would correspond exactly in size and shape with each of the other segments. It would also be noted that the space between the two smaller segments is materially larger than the other spaces. The reason for this will be hereinafter set forth.

Secured to the armature 10 by screws 15, but insulated therefrom by rubber bushings 16, is an annular metal plate 17, having supporting spring arms 18, through the ends of which the screws 15 extend. Mounted upon the annular plate 17 is a segment 19 (Figs. 2 and 4) which is in radial alinement with the portion of the armature having the greatest bulk, and said segment 19 is held by the spring arms 18 against the segments 14 on the fiber plate 13. It is to be understood that if the armature consists of a plurality of sections gradually increasing in bulk from one end thereof to the other as, illustrated in Fig. 5, a number of segments 19 will be employed which will correspond to the number of sections and that each segment will be locked in radial alinement with the portion of greatest bulk.

The segment 19 (see Fig. 4) rotates with the armature and in its movement bridges all of the spaces between the segments 14, except the space between the two smaller segments which space however, it is too short to bridge.

By reference to Fig. 3 of the drawing, it will be noted that the field magnets 6, are arranged in series and that if no two of the segments 14 are connected, the current will successively traverse all of the coils 6. It will be noted however, that each field magnet is connected at opposite sides thereof with adjacent segments 14 so that as the segment 19 moves over the segments 14, it will necessarily cut the field magnets successively out of circuit. Inasmuch as the segment 19 is in radial alinement with the portion of the armature of greatest bulk, it will be obvious that the field magnet which is directly opposite the portion of the armature of greatest bulk will be short-circuited and will accordingly exercise no influence upon the armature. The field magnets are so wound that their inner ends are all similarly magnetized, while by reason of the frame shaft and armature being of magnetic metal, the armature will be oppositely magnetized and will accordingly be attracted by all of the field magnets except the one directly opposite the portion of greatest bulk, which is out of circuit as has been explained. By reason of the fact that the armature cuts a greater number of lines of magnetic force and presents a greater bulk on one side of each energized field magnet than on the other, the armature will move under the influence of this attraction in a direction to bring a constantly greater bulk of metal in front of each energized magnet. Furthermore, as each magnet is short-circuited, and accordingly inactive when the portion of the armature of greatest bulk is opposite thereof, there is no counteracting influence or attraction; all of the magnets when energized producing a continuous torque in the same direction of rotation.

When the segment 19 first completely bridges a gap between two of the segments 14, it cuts out of circuit a magnet directly opposite the portion of greatest bulk of the armature and maintains the coil out of circuit only long enough for such portion to move out of the direct range of influence of such magnet, whereupon the current flows through all of the magnets until the portion of greatest bulk of the armature comes directly opposite the pole piece of the next adjacent magnet, whereupon the operation is repeated.

It will be understood, that the current flows through the field magnets always in the same direction thereby overcoming any loss in efficiency due to reversal of current through the field coils, and that all of the field magnets act upon the armature to produce rotation thereof during a portion of the time of operation, and that all but one of the field magnets act upon the armature to produce rotation thereof during the remainder of the time of operation.

Various modifications of the principle of my invention will readily suggest themselves to those skilled in the art, and it is therefore to be understood that the invention for which protection is applied for herein, is not restricted to the particular construction shown, and described, but embodies the features broadly defined in the appended claims.

Having described my invention, I claim:

1. A direct current motor, comprising field magnets, means electrically connecting the opposite sides of said magnets with insulated contact elements, an armature of magnetic material having a portion thereof disposed in proximity to a plurality of said field magnets, said portion increasing in bulk circumferentially and means associated with said armature, adapted to successively bridge the contact elements to which are connected the ends of each field magnet when the portion of the armature of greatest bulk is opposite thereof.

2. A direct current motor, comprising an armature, a plurality of normally energized field magnets, disposed about said armature, said armature having a portion of magnetic metal increasing in bulk circumferentially, and disposed in proximity to and under the magnetic influence of a plurality of said field magnets, and means to successively deenergize each of said field magnets when the portion of said armature of greatest bulk is opposite thereof, substantially as described.

3. A direct current motor comprising an armature, a plurality of normally energized field magnets symmetrically disposed about said armature, said armature having a portion of magnetic metal increasing in bulk circumferentially from one end thereof to the other, and disposed in proximity to, and under the magnetic influence of a plurality of said field magnets, and means to severally and successively deënergize each of said field magnets when the portion of said armature of greatest bulk is opposite thereof.

4. A direct current motor comprising a plurality of field magnets, an armature comprising a wedge-shape strip of magnetic metal bent into circular form with a small space between the ends thereof, said strip being in proximity to, and under the magnetic influence of, the said field magnets, and means to successively deënergize each of said field magnets, when the thickest portion of said wedge-shape strip is opposite thereof, substantially as described.

In testimony whereof I affix my signature in presence of two witnesses.

ALFRED L. SOHM.

Witnesses:
 WILLIAM H. G. MILLER,
 JOHN P. ARMSTRONG.